United States Patent [19]
Iino et al.

[11] Patent Number: 5,647,019
[45] Date of Patent: Jul. 8, 1997

[54] METHOD OF IDENTIFYING A POSITION OF OBJECT IN CAMERA IMAGE

[75] Inventors: Mitsutoshi Iino; Shiro Nakatao, both of Tokyo, Japan

[73] Assignees: Fuji Electric Co., Ltd., Kanagawa; Fuji Facom Corporation, Tokyo, both of Japan

[21] Appl. No.: 69,004

[22] Filed: May 28, 1993

[30] Foreign Application Priority Data

May 29, 1992 [JP] Japan .................... 4-163837

[51] Int. Cl.⁶ .................................................. G06T 3/00
[52] U.S. Cl. ..................... 382/154; 382/282; 395/119; 348/442
[58] Field of Search ..................... 382/48, 49, 25, 382/54, 56, 154, 285, 282, 283, 291, 293, 305, 41, 44; 364/571.01, 443, 413.21; 395/400, 119, 127; 348/442; 358/95

[56] References Cited

U.S. PATENT DOCUMENTS

| | | | |
|---|---|---|---|
| 4,143,003 | 3/1979 | Heckman, Jr. et al. | 358/95 |
| 4,179,693 | 12/1979 | Evans et al. | 364/443 |
| 4,460,958 | 7/1984 | Christopher et al. | 364/200 |
| 4,704,694 | 11/1987 | Czerniejewski | 364/513 |
| 4,731,864 | 3/1988 | Modla | 382/54 |
| 4,825,394 | 4/1989 | Beamish et al. | 364/571.01 |
| 4,890,249 | 12/1989 | Yen | 364/578 |
| 5,047,931 | 9/1991 | Lin | 364/413.21 |
| 5,129,054 | 7/1992 | Alstad et al. | 395/119 |
| 5,185,667 | 2/1993 | Zimmermann | 382/44 |
| 5,444,792 | 8/1995 | Grangeat et al. | 382/276 |

OTHER PUBLICATIONS

"A Quantitative Approach to Camera Fixation," Daniel Raviv—Computer Vision & Pattern Recognition, 1991, pp. 386–392.

"Man–Machine Interface for Plant Control Centers to act Direct Manipulation Technique on Image", Masayuki Tani et. al., IEE Paper (D). vol. 111, No. 12, pp. 1023–1030, (1991).

*Primary Examiner*—Michael T. Razavi
*Assistant Examiner*—Larry J. Prikockis
*Attorney, Agent, or Firm*—Finnegan, Henderson, Farabow, Garrett & Dunner, L.L.P.

[57] ABSTRACT

The present invention relates to a method of identifying object images displayed in a camera image, the method comprising the step of, comparing a predetermined point mapped in the camera image in a spherical polar coordinates with a position of the camera as an origin, with a plurality of cursor windows including the object images respectively in the camera image, in which vertexes and center point of each window are mapped in the camera image in a spherical polar coordinates with a position of the camera as an origin, so that an object included in a cursor window corresponding to the predetermined point is identified.

2 Claims, 5 Drawing Sheets

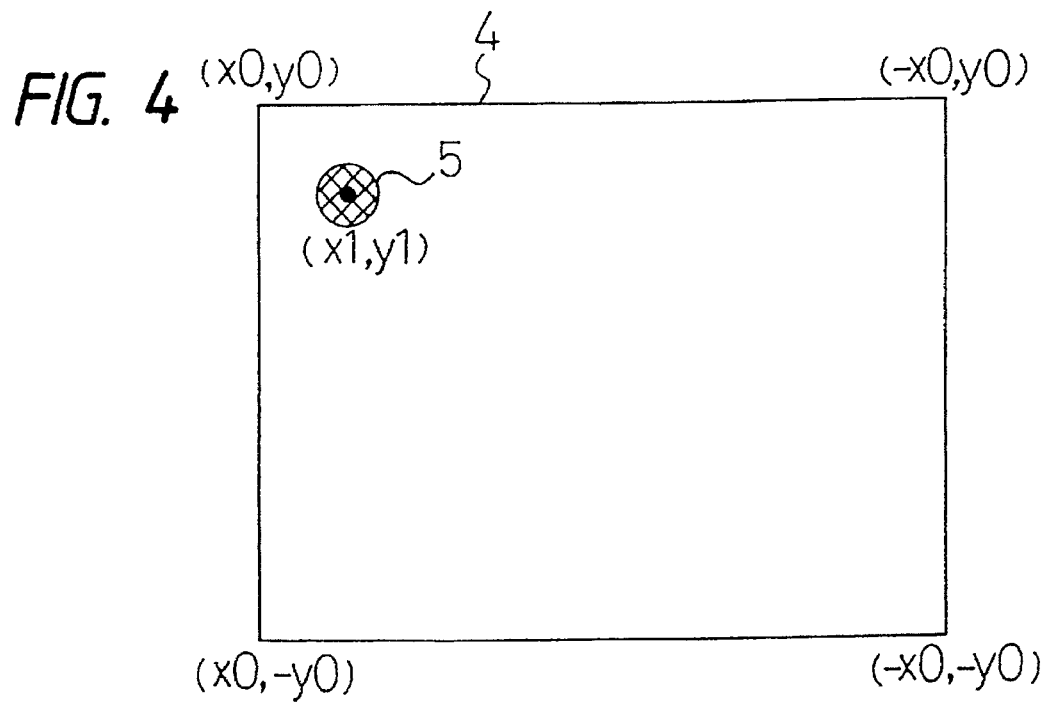
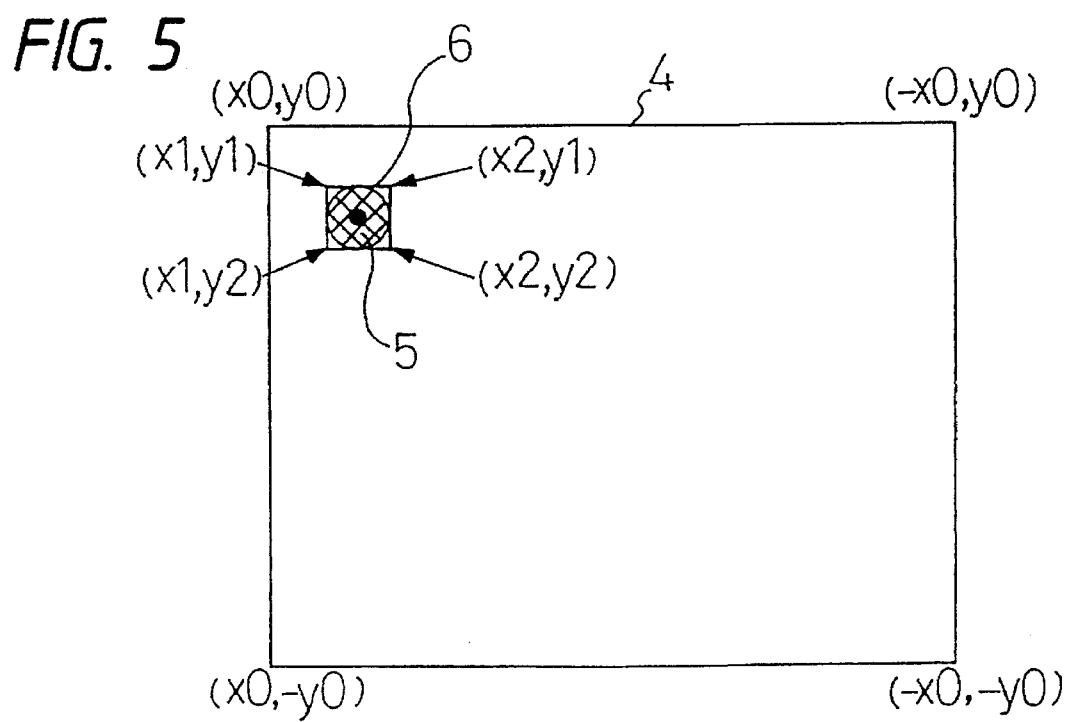

METHOD OF IDENTIFYING A POSITION OF OBJECT IN CAMERA IMAGE

BACKGROUND OF THE INVENTION

This invention relates to a method of identifying an object image from a camera image in order, for instance, to retrieve data on the object, in which a position of the object is mapped in a three-dimensional space by using the camera image of the object which is picked up by a television camera connected to a computer.

With respect to a mapping step for an object position in a camera image, the following two methods are known in the art which are described in a thesis entitled "Man-Machine Interface for Plant Control Centers to act Direct Manipulation Technique on Image" by Masayuki Tani et al. (IEE Paper(D), vol 111, No. 12, 1991, pp 1023 to 1030):

(1) First Mapping Method—A camera image display range is a two-dimensional orthogonal coordinates space, and the position of an object is given by two-dimensional orthogonal coordinates.

The first mapping method will be described with reference to FIGS. 7 and 8.

A left part of FIG. 7 shows an example of positional relationships between a television camera and an object. In the left part of FIG. 7, there is the television camera 1, a plane 2 is formed an image; and the object 3 is an image of which is to be picked up.

The right part of FIG. 7 shows a camera image display range in the arrangement shown in the left part. In the right part of FIG. 7, the camera image display range 4 and the image 5 of the object are represented (hereinafter referred to as "an object image", when applicable). The camera image display range 4 is a two-dimensional orthogonal coordinate space defined by coordinates range of (0, 0) to (Xmax, Ymax), and, in the camera image display range, the coordinates of the position of the object (the coordinates of the center of the object image 5) are (x1, y1).

A left part of FIG. 8 shows another example of positional relationships between the television camera and the object 3 in a case where a horizontal angle of the television camera 1 is changed. A right part of FIG. 8 shows a camera image display range 4 in the arrangement shown in the left part of FIG. 8. In FIG. 8, parts corresponding functionally to those which have been described with reference to FIG. 7 are therefore designated by the same reference numerals or characters; that is, in FIGS. 7 and 8, like parts are designated by like reference numerals or characters.

In FIG. 8, similarly as in FIG. 7, the image display range 4 is defined by the coordinates range (0,0) to (Xmax, Ymax). However, it should be noted that the coordinates of the position of the object are (x2, y1) different from those in the case of FIG. 7.

Hence, in the case of the first mapping method, as camera parameters such as the position, elevation angle, horizontal angle, and view angle of the television camera change, the coordinates of the position of the object (hereinafter referred to as "an object position", when applicable) are changed in the camera image display range. Therefore, in mapping the position of an object, the mapping operation must be carried out for each of the images picked up by the camera with the camera parameter changed.

(2) Second Mapping Method—A camera image is projected on a two-dimensional space in a three-dimensional space, and the position of the object and the camera are represented by three-dimensional orthogonal coordinates.

The second mapping method will be described with reference to FIGS. 9 and 10.

FIG. 9 shows one example of positional relationships between a position of the television camera, a position of the actual object 3, and a position of the object image 5. FIG. 10 shows another example of the positional relationships between the position of the television camera 1, the position of the actual object 3, and the position of the object images when the position and angles (horizontal angle, and elevation angle) of the camera are changed. In FIGS. 9 and 10, the object image 5 is represented in the image display range 4, and the remaining parts corresponding functionally to those which have been described with reference to FIGS. 7 and 8 are therefore designated by the same reference numerals or characters.

Further in FIG. 9, the position of the television camera in the three-dimensional orthogonal coordinate space is given coordinates (X1, Y1, Z1), the position of the actual object in the same space is given coordinates (X2, Y2, Z2), and the position of the object in the two-dimensional orthogonal coordinate space is given coordinates (X3, Y3) (which are the coordinates of the center of the object image 5). Similarly, in FIG. 10, the position of the television camera in the three-dimensional orthogonal coordinate space is given coordinates (X1', Y1', Z1'), the position of the actual object in the same space is given coordinates (X2, Y2, Z2), and the position of the object in the two-dimensional orthogonal coordinate space is given coordinates (X3', Y3') (which are the coordinates of the center of the object image 5).

In the second mapping method, the position of the actual object is represented by the coordinates in the three-dimensional orthogonal coordinate space as was described above. Hence, even when the parameters of the camera change, the coordinates of the position of the object in the plane of projection can be obtained by performing a projection calculation. However, in setting the object position coordinates, it is necessary to input three-dimensional coordinates data. In addition, whenever the parameters of the camera change, it is necessary to perform an intricate three-dimensional projection calculation.

Accordingly the above-described two mapping methods suffer from the following problems:

(1) First Mapping Method

When the camera parameters such as the position, elevation angle, horizontal angle, view angle of a camera change, the coordinates of the position of the object in the image display range are changed. Hence, as for each of the parameters of the camera, the coordinates must be determined. Thus, it is substantially difficult to apply the first mapping method to an image pickup system in which camera parameters may change.

(2) Second Mapping Method

The position of the camera, and the position of the actual object are given three-dimensional coordinates. Hence, the second mapping method is applicable to the case where the camera parameters change. However, whenever the camera parameters change, it is necessary to perform the three-dimensional projection calculation, and therefore the amount of three-dimensional projection calculation is considerably large. Furthermore, its data setting operation is rather troublesome, because it is necessary to provide three-dimensional coordinate data.

SUMMARY OF THE INVENTION

Accordingly, an object of the present invention is to eliminate the above-described difficulties accompanying a conventional object position mapping method. More specifically, an object of this invention is to provide: an object position mapping method which is readily applied to an image pickup system in which camera parameters may change, and in which the amount of projection calculation is relatively small, and a data inputting operation is simplified.

The foregoing object of the present invention has been achieved by the provision of the following method:

First, the image of an object which is picked up by a television camera connected to a computer is utilized to map the position of the object in a three-dimensional space; in which, according to the invention, the coordinates of the vertexes of a camera image display range are employed as a two-dimensional coordinate space, coordinates locating the image of the object in the camera image display range, and camera parameters are used, so that the position of the object is mapped in a spherical polar coordinate system with the position of the camera as the origin.

Further a method according to the invention is a method of identifying an object in a camera image, in which a cursor for pointing to the image of an object in a camera image display range is set, the position of the cursor is mapped by the above-described mapping procedure, the position of a point specified in the camera image display range is mapped by the same mapping procedure, and in a spherical polar coordinate system, the position of the cursor and the position of the point are subjected to comparison, to identify the object indicated by the point thus specified.

In the invention, the position of a television camera (hereinafter referred to as "a camera position", when applicable) is fixed, and the position of an object, the image of which is picked up by the television camera, is represented by spherical polar coordinates with the camera position as the origin.

BRIEF DESCRIPTION OF THE DRAWINGS

FIG. 4 is a diagram showing the image in FIG. 1.

FIG. 5 is a diagram showing the image in FIG. 1.

PREFERRED EMBODIMENTS OF THE INVENTION

Figure 1:
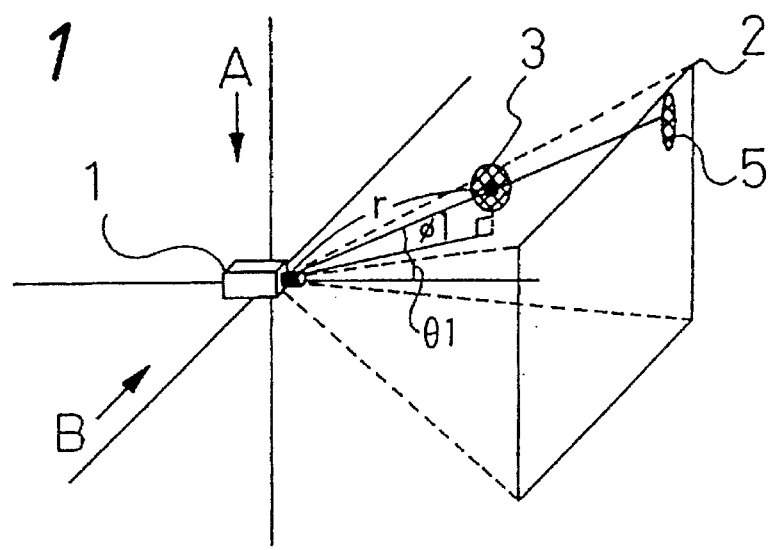
FIG. 1 is a diagram showing positional relationships between a television camera 1, an actual object 3, and an image of the object 5, for describing function of the invention.

FIG. 1 shows one example of positional relationships between the television camera and the position of the actual object, and the image of the latter. In FIG. 1, there is the television camera 1; the object 3 is the image of which is picked up by the camera 1; a camera image projection plane 2 is projected the image 5 of the object thereon.

Figure 2:
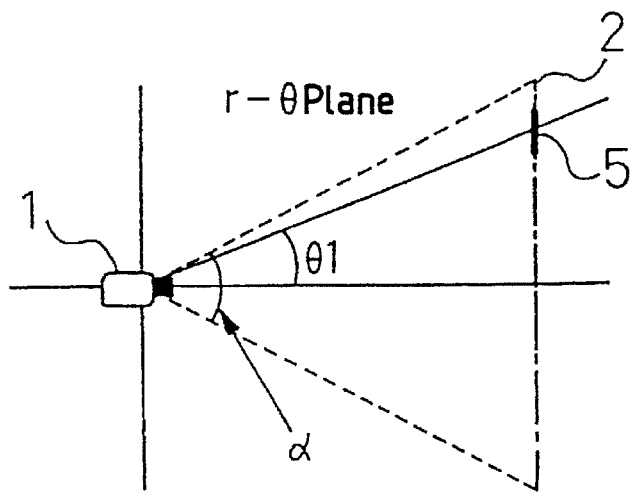
FIG. 2 is a diagram showing a r-θ plane in FIG. 1.
Figure 3:
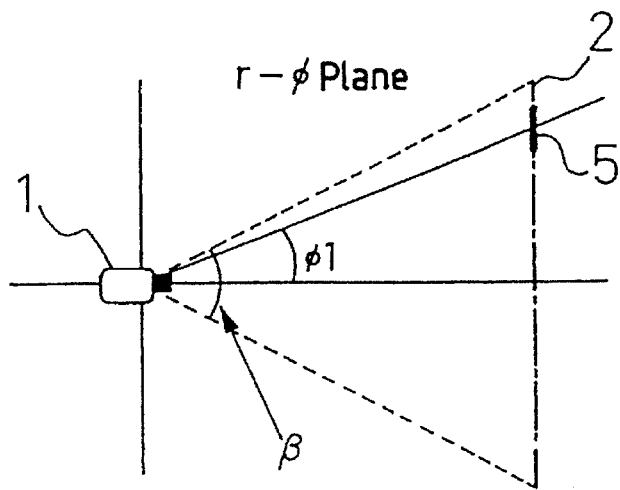
FIG. 3 is a diagram showing a r-φ plane in FIG. 1.

FIGS. 2 and 3 show positional relationships in a plane and in a r-θ plane, respectively. The angle θ is in the horizontal plane including the optical axis of the television camera 1, and the angle φ is in the vertical plane. That is, the r-θ plane in FIG. 2 is the plane which is obtained when FIG. 1 is viewed in the direction of the arrow A, and the r-φ plane in FIG. 3 is the plane obtained when FIG. 1 is viewed in the direction of the arrow B. Further in FIG. 1, reference character r designates the distance between the television camera 1 and the object 3.

As was described above, in the invention, the position of an object is expressed by using spherical polar coordinates with the position of a camera as the origin. That is, in the case of FIG. 1, the position of the object is represented by spherical polar coordinates (r, θ1, φ1). In the invention, of the camera parameters, the position of the camera is employed as the origin in the spherical polar coordinate system, and therefore the distance r cannot be obtained from the camera image. However, this does not matter so much, because television cameras such as industrial television cameras are generally fixedly positioned, and the distances from the objects are also fixed.

In FIGS. 1, 2 and 3, other camera parameters, namely, a horizontal angle, and an elevation angle are both 0, a view angle in the direction of θ is α, and a view angle in the direction of φ is β.

Now, a method of mapping the position of an object in a three-dimensional space according to its camera image will be described.

FIG. 4 shows a camera image provided in the case of FIG. 1. In FIG. 4, it is assumed that the vertexes of the rectangular camera image display range 4 are represented by coordinates (x0, y0), (−x0, y0), (x0, −y0), and (−x0, −y0), respectively, and the central coordinates of the object image 5 are (x1, y1). The view angles of the camera 1 are α in the direction of θ, and β in the direction of φ, respectively. Angle α has its apex at the position of the camera 1, one endpoint at the point (x0, 0) in the projection plane, and another endpoint at the point (−x0, 0) in the projection plane. Angle β has its apex at the position of the camera 1, one endpoint at the point (0, y0) in the projection plane, and another endpoint at the point (0, −y0) in the projection plane. Hence, the spherical polar coordinates (θ1, φ1) of the object position can be readily calculated from the following equations (1) and (2):

$$\theta_1 = \tan^{-1}\{(x_1/x_0)\tan(\alpha/2)\} \quad (1)$$

$$\phi_1 = \tan^{-1}\{(y_1/y_0)\tan(\beta/2)\} \quad (2)$$

In the case where, of the camera parameters, the horizontal angle, and the elevation angle are given, they are added, as offset values, to the above-described equations (1) and (2). That is, if it is assumed that the horizontal angle and the elevation angle of the camera 1 are θ0 and φ0, respectively, then the spherical polar coordinates (θ1, φ1) of the object position are expressed by the following equations (3) and (4):

$$\theta 1 = \theta 0 + \tan^{-1}\{(x1/x0) \tan (\alpha/2)\} \quad (3)$$

$$\phi 1 = \phi 0 + \tan^{-1}\{(y1/y0) \tan (\beta/2)\} \quad (4)$$

In a zooming operation, only the view angles of the camera are changed, and therefore the spherical polar coordinates (θ1, φ1) can be calculated merely by changing the view angles α and β in the above-described equations.

Now, a method of identifying an object in a camera image of the present invention will be described.

FIG. 5 shows a method of setting coordinates for the position of an object in a camera image display range 4 which is equal to the one in FIG. 4. In FIG. 5, a circumscribed rectangle 6 is represented as a cursor window for setting coordinates for an object image 5. Setting coordinates for the position of an object is carried out as follows:

First, a pointing device such as a so-called "mouse" is used to provide the circumscribed rectangle 6 for the object image 5 in the camera image shown in FIG. 5. The coordinates of the vertexes of the circumscribed rectangle 6 are employed for determination of the position of the object, and spherical polar coordinates are obtained therefor. If it is assumed that the coordinates of the vertexes of the circumscribed rectangle 6 in the camera image display range 4 are (x1, y1), (x2, y1), (x1, y2) and (x2, y2), respectively, then the spherical polar coordinates of the coordinates x1, x2, y1 and y2 can be calculated from the following equations (5) through (8) similarly as in the case of the equations (3) and (4) employed in the above-described mapping method according to the invention:

$$\theta 1 = \theta 0 + \tan^{-1}\{(x1/x0) \tan (\alpha/2)\} \quad (5)$$

$$\phi 1 = \phi 0 + \tan^{-1}\{(y1/y0) \tan (\beta/2)\} \quad (6)$$

$$\theta 2 = \theta 0 + \tan^{-1}\{(x2/x0) \tan (\alpha/2)\} \quad (7)$$

$$\phi 2 = \phi 0 + \tan^{-1}\{(y2/y0) \tan (\beta/2)\} \quad (8)$$

In equations (5) through (8), θ1, θ2, φ1 and φ2 are the spherical polar coordinates of the coordinates x1, x2, y1 and y2, respectively; θ0 and φ0 are the horizontal angle and the elevation angle of the camera, respectively; and α and β are the view angles of the camera in the directions of θ and φ, respectively.

The values θ1, θ2, φ1 and φ2 thus obtained through calculation are set and registered as the coordinates of the position of the object.

The cursor window may be other than a circumscribed rectangle, if it is able to specify the position of the object image 5.

In retrieving a object 3 with a computer, the pointing device is used to point the object image 5 in the camera image. In this connection, it is assumed that the coordinates of the pointer of the pointing device are (x, y). Calculation is carried out similarly as on the above-described equations (3) and (4) to obtain the spherical polar coordinates (θ, φ) of the specified point. The spherical polar coordinates thus obtained are compared with the spherical polar coordinates which have been set according to the above-described coordinate setting method, and the object is identified which has spherical polar coordinates θ1, θ2, φ1 and φ2 which meet the following expression (9):

$$\theta 1 \leq \theta \leq \theta 2, \text{ and } \phi 1 \leq \phi \leq \phi 2 \quad (9)$$

Thus, the specified object can be retrieved readily and quickly.

Accordingly, in the case where it is required to read a variety of data on an object specified and to display them, the object can be identified with ease.

EXAMPLE

One preferred example of this invention will be described with reference to FIG. 6.

Figure 6:
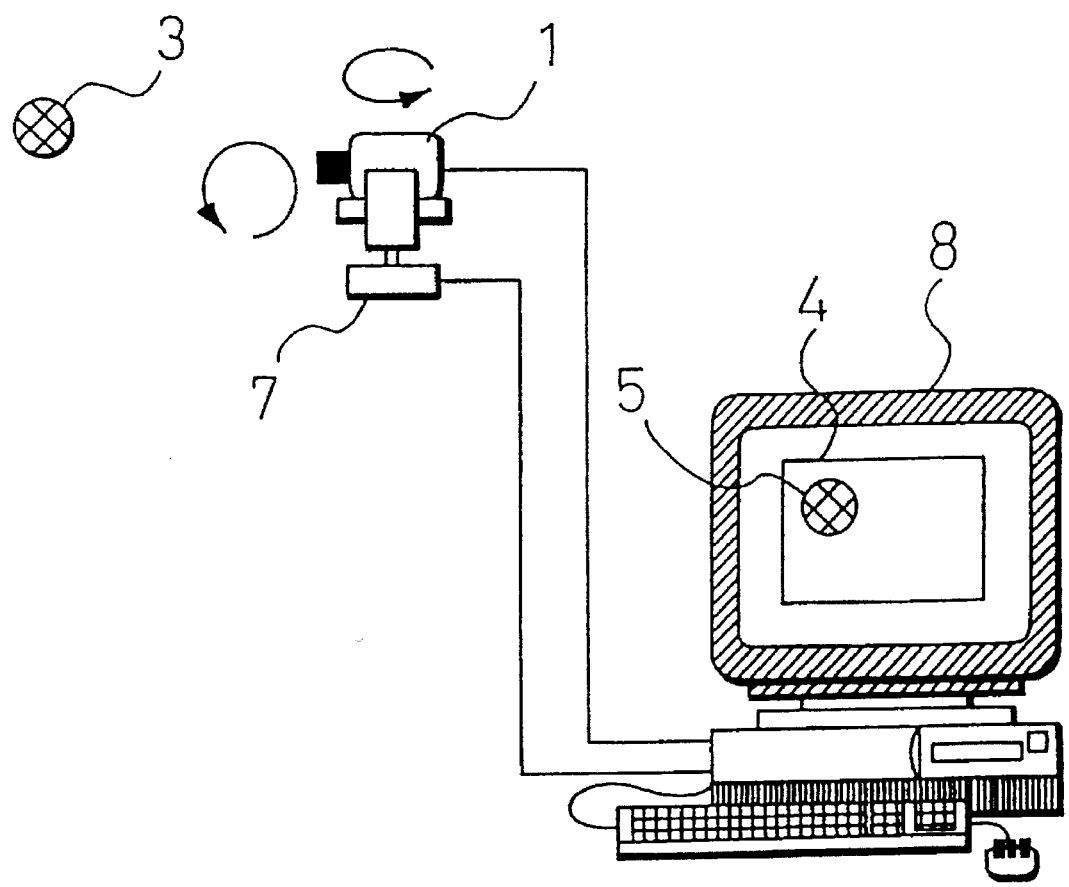
FIG. 6 is a diagram showing the arrangement of an image pickup system, which constitutes one embodiment of the invention.
Figure 7:
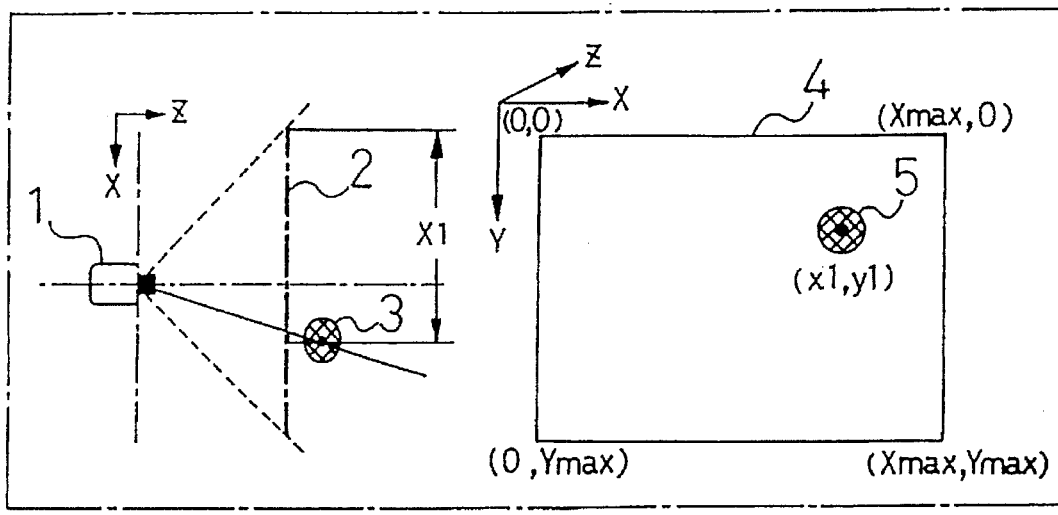
FIG. 7 is a diagram showing positional relationships between a television camera and an actual object in a first conventional mapping method, and a camera image display range relevant thereto.
Figure 8:
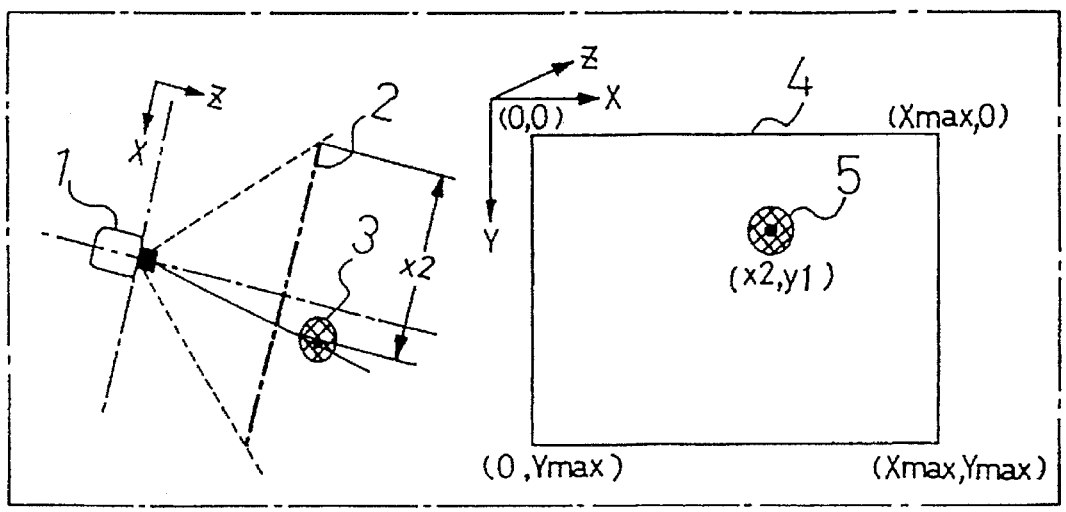
FIG. 8 is a diagram showing the positional relationships between the television camera and the actual object with the horizontal angle of the camera changed in the first conventional mapping, and a camera image display ranged relevant thereto.
Figure 9:
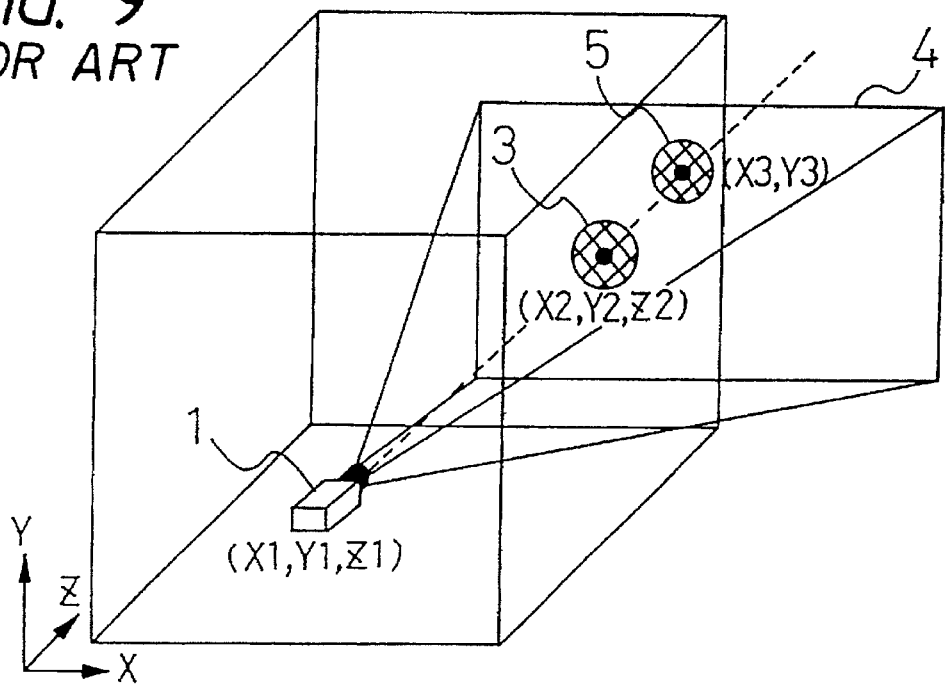
FIG. 9 is a diagram showing positional relationships between a television camera and an actual object in a second conventional mapping method, and a camera image display range relevant thereto.
Figure 10:
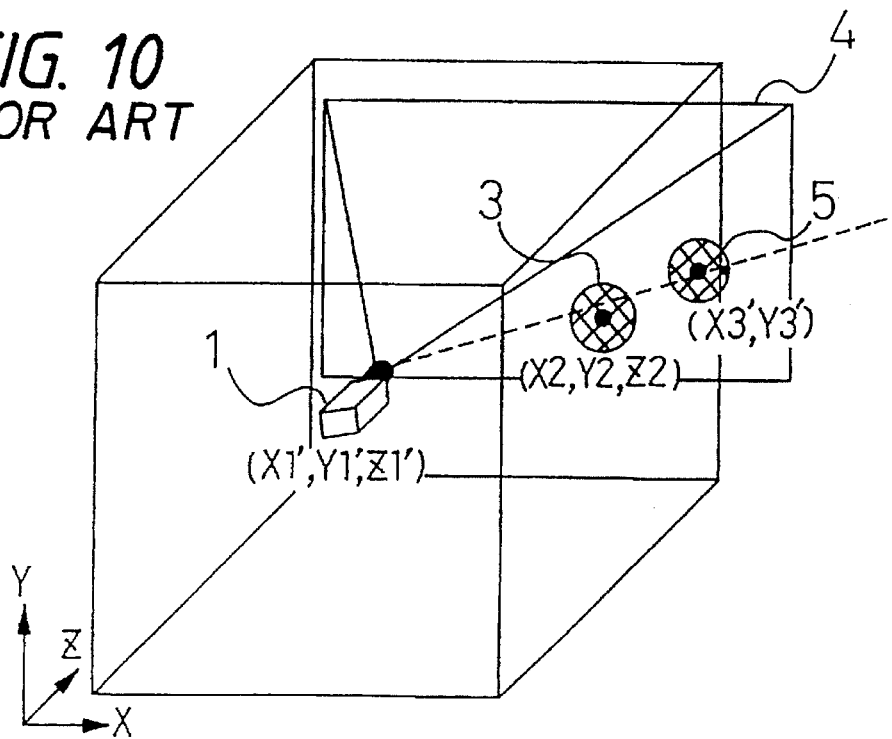
FIG. 10 is an explanatory diagram showing the positional relationships between the television camera and the actual object with camera parameters changed in the second conventional mapping, and a camera image display ranged relevant thereto.

FIG. 6 shows the whole arrangement of an image pickup system. In FIG. 6, a universal head 7 controls the direction of a television camera; and a computer 8 executes operations of mapping and setting the coordinates of an object.

The camera 1 and the universal head 7 are connected to the computer 8, so that images picked up by the camera 1 are applied to the computer 8. The horizontal angle and the elevation angle of the camera 1, which correspond to the above-described values θ and φ, are controlled to predetermined values by the universal head, which is operated according to instructions from the computer 8. In order to control the view angles of the camera 1 to predetermined values, the zooming factor of the camera 1 is changed according to an instruction from the computer 8. The image applied to the computer 8 is displayed in the camera image display range 4 of a CRT (cathode ray tube).

The operation of the above-described embodiment will be described.

First, the image of the object 3 is picked up by the camera 1, and applied to the computer 8. Of the camera parameters, the horizontal angle and the elevation angle are changed by the universal head 7 under the control of the computer 8. Those view angles are determined depending on the zooming factor of the camera 1.

The image applied to the computer 8 is displayed in the camera image display range 4 of the CRT. In this case, the object image 5 in the display range 4 can be represented by spherical polar coordinates calculated from the above-described equations (1) and (2), or (3) and (4). Thus, mapping the object image in the three-dimensional space can be achieved readily and quickly.

In setting coordinates for the position of the object in order to identify the object in the projection plane, from the camera image, the operator uses the pointing device to set the circumscribed rectangular shape 6 in the camera image display range 4. The computer performs calculation on the above-described equations (5) through (8) to obtain spherical polar coordinates θ1, θ2, φ1 and φ2, and sets the spherical polar coordinates as the coordinates of the object surrounded by the circumscribed rectangle shape 6, and registers and stores them in memory means.

In order to recall a variety of stored data of an object in the display range 4, the pointing device is used to specify one point in the aimed object displayed on the display range 4. The spherical polar coordinates of the point thus specified are calculated by the computer 8. The spherical polar coordinates thus calculated are used to retrieve the coordinates of the object stored in the memory means according to the above-described expression (9), so that the object specified is identified. The data on the object, which have been stored, are read out of the memory means, and displayed on the CRT.

As was described above, in the mapping procedure of the present invention, the coordinates of the position of the object in the camera image are expressed in the spherical polar coordinate system. Therefore, even when the camera parameters change, mapping the position of the object in the three-dimensional space can be achieved readily and quickly merely by performing simple calculations.

In the identifying method of the present invention, the cursor for pointing to the image of an object in the camera is set, the spherical polar coordinate obtained by mapping the position of the cursor according to the mapping method and the spherical polar coordinates obtained by mapping the position of a point specified according to the same mapping method are subjected to comparison for identification of the object. This eliminates the troublesome process that, in setting coordinates, intricate data are set and input. Hence, the object at a position specified, and its data can be retrieved readily and quickly.

What is claimed is:

1. A method of identifying images of three-dimensional objects displayed by a camera as a two-dimensional camera image, comprising the steps of:

mapping coordinates of vertexes and a center point of a cursor window, including at least one of said objects from the camera image, the cursor window and the center point being mapped from two-dimensional coordinates into spherical polar coordinates with a position of said camera as an origin for the spherical polar coordinates;

pointing to a point in said camera image, said pointed-to point being mapped from said camera image to spherical polar coordinates with the position of said camera as the origin, the spherical polar coordinates of said pointed-to point being adjusted in accordance with at least one of an elevation angle, horizontal angle, and view angle of said camera; and comparing said mapped pointed-to point with said mapped cursor window vertexes to identify an object included in the cursor window corresponding to said pointed-to point.

2. A method according to claim 1, wherein said cursor window has a shape circumscribing the at least one of said objects.

* * * * *